Patented June 29, 1948

UNITED STATES PATENT OFFICE 2,444,238

COMPOSITE PIGMENTS

Leif Aagaard, Red Bank, N. J., and Winfred J. Cauwenberg, Piney River, and Walter R. Whately, Lynchburg, Va., assignors to American Cyanamid Company, New York, N. Y., a corporation of Maine No Drawing. Application August 29, 1946, Serial No. 693,826

2 Claims. (Cl. 106—300)

This invention relates to extended titanium oxide pigments and relates more particularly to composite titanium oxide-calcium sulfate pigments.

It is an object of the invention to provide a method of preparing composite titanium oxide-calcium sulfate pigments having exceptional hiding power, tinting strength, gloss, and texture.

An additional object of the invention resides in the provision of a method whereby the calcium sulfate extender, in the gypsum modification thereof, is formed in situ while the inherent undesirable growth of the gypsum crystals to disproportionate size is prevented.

Further objects of the invention will be apparent to those skilled in the art from the following detailed description of preferred embodiments thereof.

It has been found that composite titanium oxide-calcium sulfate pigments, containing in excess of about 15% $TiO_2$, and preferably containing from about 25% to about 75% $TiO_2$ and from about 75% to about 25% $CaSO_4$, may be prepared by the reaction of CaO or $Ca(OH)_2$ with an aqueous sulfuric acid slurry or calcined hydrated titanium oxide.

The titanium oxide present in the aqueous sulfuric acid inhibits crystal growth of the gypsum, and the resultant composite precipitate requires only a relatively moderate calcination treatment to dehydrate the gypsum. The composite pigment so produced has uniform particle size and exceptional color, hiding power, gloss, and texture characteristics.

The calcined $TiO_2$ employed in carrying out the method of the invention may be obtained from any convenient source, and may possess the crystal structure of either rutile or anatase $TiO_2$. For purposes of illustration the following specific examples are directed to the use of calcined rutile and anatase $TiO_2$ obtained by the conventional thermal hydrolysis of clarified liquors from the sulfuric acid digestion of titanium bearing ores, followed by calcination of the hydrated $TiO_2$ in the presence of a rutile seeding agent to produce $TiO_2$ having the rutile crystal modification, or in the absence of any seed material to produce $TiO_2$ having the anatase crystal modification.

Example 1

133 gm. of calcined and micropulverized rutile $TiO_2$ was slurried in 445 cc. of water. To this slurry was added 172 cc. (315.4 gm.) of 93% $H_2SO_4$ and 20 cc. of reduced titanium sulfate solution containing 2 gm. of $TiO_2$. The resulting mixture contained approximately 39% $H_2SO_4$. This suspension was treated with 178 gm. of lime $(Ca(OH)_2)$ suspended in 1600 cc. of water. After washing the precipitate with water saturated with calcium sulfate, the filter cake was calcined for 1 hour at 750° C. to dehydrate the calcium sulfate. The composite pigment contained 32.4% titanium dioxide and 67.6% calcium sulfate. The product had very good color and a tinting strength of 635 when evaluated by the National Lead Company method as described in Gardner and Sward "Physical and chemical examination of paints, varnishes, lacquers and colors," 10th edition, pages 44 and 45.

Example 2

Calcined rutile $TiO_2$ was hydroclassified, coagulated with $MgSO_4$, and dewatered. 433 gm. of this filter cake, containing 266 gm. of $TiO_2$, was added to a mixture of 377 cc. of $H_2O$ and 344 cc. (630.9 gm.) of $H_2SO_4$. The resulting slurry contained approximately 50% $H_2SO_4$. To this suspension was added 3763 gm. of aqueous lime slurry, containing 356 gm. of $Ca(OH)_2$. After 1 hour of agitation, 20 cc. of reduced titanium sulfate solution containing 2 gm. of $TiO_2$ was added, and the precipitate was washed with water saturated with calcium sulfate. The washed filter cake was calcined for 30 minutes at 800° C. to dehydrate the calcium sulfate. The composite pigment so produced contained 30% $TiO_2$ and 70% calcium sulfate. It had exceptionally good color, good texture, and a tinting strength of 600.

Example 3

To 634 gm. of an aqueous colloidal suspension of hydroclassified calcined rutile $TiO_2$, containing 89 gm. of $TiO_2$ was added 344 cc. (630.9 gm.) of 93% $H_2SO_4$. This suspension was treated with 3946 gm. of an aqueous lime slurry containing 356 gm. of $Ca(OH)_2$. After 1 hour of agitation, an aqueous suspension of hydroclassified calcined rutile $TiO_2$ containing 177 gm. of $TiO_2$ and 20 cc. of reduced titanium sulfate solution (2 gm. $TiO_2$) was added to the mixture. The precipitate was washed with water saturated with calcium sulfate, and the filter cake was calcined for 30 minutes at 800° C. to dehydrate the calcium sulfate. The product contained 30% $TiO_2$ and 70% calcium sulfate. The pigment had good color and a tinting strength of 610.

Example 4

350 gm. of lime $(Ca(OH)_2)$ was added to 844 cc. of an aqueous slurry containing 113 gm. of calcined rutile $TiO_2$ and the mixture was diluted to a volume of 3000 cc. The lime-$TiO_2$ slurry was added gradually, with agitation, to 551 gm. of 93% $H_2SO_4$. After 1 hour of agitation, 25 cc. of reduced aqueous titanium sulfate solution containing 2 gm. of $TiO_2$ was added and the mixture was filtered and washed with water saturated with calcium sulfate. The washed cake was calcined for 30 minutes at 850° C. to dehydrate the calcium sulfate. The calcined pigment was then chaser-milled for 1 hour and micropulverized. The product contained 15% TiO$_2$ and 85% calcium sulfate. It had good color characteristics and a tinting strength of 330.

*Example 5*

350 gm. of lime was added to 4955 cc. of an aqueous slurry containing 644 gm. of hydroclassified calcined rutile TiO$_2$ and the mixture was diluted with 1750 cc. of water. The slurry was added gradually to 551 gm. of 93% H$_2$SO$_4$. After 1 hour of agitation, 25 cc. of reduced titanium sulfate solution containing 2 gm. of TiO$_2$ was added to the mixture, which was then filtered and washed with water saturated with calcium sulfate. The washed filter cake was calcined for 3 minutes at 850° C. to dehydrate the calcium sulfate. The so-produced composite pigment contained 50% TiO$_2$ and 50% calcium sulfate. The product had very good color and a tinting strength of 960.

*Example 6*

175 gm. of Ca(OH)$_2$ was mixed with 875 cc. of water and 7200 cc. of an aqueous slurry of hydroclassified calcined rutile TiO$_2$ containing 966 gm. of TiO$_2$. This slurry was added gradually to 275 gm. of 93% H$_2$SO$_4$. After 1 hour of agitation, 25 cc. of reduced titanium sulfate solution containing 2 gm. of TiO$_2$ was added and the mixture was filtered. The precipitate was washed with water saturated with calcium sulfate and was thereafter calcined for 30 minutes at 850° C. to dehydrate the calcium sulfate. The product contained 75% TiO$_2$ and 25% calcium sulfate. The composite pigment had exceptionally good color and a tinting strength of 1230.

*Example 7*

350 gm. of Ca(OH)$_2$ was mixed with 276 gm. of calcined anatase TiO$_2$ and the mixture was made up with water to a volume of 3000 cc. The resulting slurry was added gradually to 551 gm. of 93% H$_2$SO$_4$. After 1 hour of agitation, 25 cc. of reduced titanium sulfate solution containing 2 gm. of TiO$_2$ was added to the mixture. The mixture was filtered and washed with water saturated with calcium sulfate. The washed filter cake was then calcined for 30 minutes at 850° C. to dehydrate the calcium sulfate. The composite pigment so produced contained 30% anatase TiO$_2$ and 70% calcium sulfate. It had very good color and a tinting strength of 500.

It will be noted that the concentration of sulfuric acid is maintained at or below 50%. When acid concentrations in excess of 50% are employed, the anhydrite crystal modification of calcium sulfate is produced. For pigment purposes, gypsum is much more desirable than anhydrite because of its superior hiding power, resistance to water after calcination, and other characteristics. Moreover, the use of dilute sulfuric acid slurries, preferably having a sulfuric acid concentration of 15%–50%, represents an important saving in sulfuric acid over the comparatively greater acid concentrations required for the production of anhydrite. The calcium sulfate-forming reaction is also preferably carried out at relatively low temperatures, as for example room temperature, to prevent any formation of anhydrite, although temperatures as high as from about 70° C. to about 80° C. may be employed if desired.

By precipitating calcium sulfate in a relatively dilute sulfuric acid slurry of calcined titanium oxide, in accordance with the present invention, two important advantages are simultaneously obtained. Excessive growth of the gypsum crystals is prevented by the calcined titanium oxide, thus producing better pigment properties in the gypsum while the optimum particle size of the preferably prepared calcined titanium oxide is not disturbed. The present invention can therefore be practiced by first preparing either anatase or rutile titanium oxide of the desired particle size from hydrated titanium oxide obtained by thermal hydrolysis of clarified liquors from the sulfuric acid digestion of titanium-bearing ores in the usual manner, with or without the use of a seeding or nucleating agent, and the particle size and crystal structure of the calcined titanium oxide may thereby be independently regulated. The resulting titanium oxide pigment is then employed to control the particle size of the calcium sulfate crystals, and thus a composite titanium oxide-calcium sulfate pigment of improved color characteristics, tinting strength, gloss, and hiding power is obtained.

It will also be apparent from the aforegoing illustrative examples that the manner of preparing the mixture of calcined TiO$_2$, lime, and dilute aqueous sulfuric acid is not limited to any particular procedure. The lime may be added to a slurry of calcined TiO$_2$ in dilute aqueous sulfuric acid, or, if desired, the lime may first be slurried, or otherwise mixed, with the calcined TiO$_2$ and this mixture thereafter incorporated with the dilute aqueous sulfuric acid.

What we claim is:

1. A method of preparing a composite titanium oxide-calcium sulfate pigment which comprises precipitating calcium sulfate in the presence of calcined titanium oxide by admixing lime, calcined titanium oxide, and aqueous sulfuric acid of not more than 50% concentration, said titanium oxide and said lime being present in amounts such that the resulting composite precipitate will contain from about 15% to about 75% titanium oxide and from about 85% to about 25% calcium sulfate, water washing the composite precipitate, and dehydrating the precipitate.

2. A method of preparing a composite titanium oxide-calcium sulfate pigment which comprises slurrying calcined titanium oxide with aqueous sulfuric acid having a concentration of not more than 50%, mixing with this slurry lime in such amount that the resulting composite precipitate will contain from about 15% to about 75% titanium oxide and from about 85% to about 25% calcium sulfate, filtering the mixture, water washing the composite precipitate, and dehydrating the composite precipitate.

LEIF AAGAARD.
WINFRED J. CAUWENBERG.
WALTER R. WHATELY.

REFERENCES CITED

The following references are of record in the file of this patent:

UNITED STATES PATENTS

| Number | Name | Date |
|---|---|---|
| 2,326,157 | McCord | Aug. 10, 1943 |
| 2,299,120 | Allan | Oct. 20, 1942 |
| 2,177,250 | Hanahan | Oct. 24, 1939 |
| 1,361,866 | Jebsen | Dec. 14, 1920 |

FOREIGN PATENTS

| Number | Country | Date |
|---|---|---|
| 346,801 | Great Britain | Apr. 13, 1931 |
| 149,316 | Great Britain | June 16, 1921 |